(12) United States Patent
Weinhold

(10) Patent No.: US 6,523,230 B1
(45) Date of Patent: Feb. 25, 2003

(54) COUPLING FOR CORRUGATED FLEXIBLE HOSE

(76) Inventor: Karl Weinhold, Im Jagdfeld 43, D-41464, Neuss (DE)

( * ) Notice: Subject to any disclaimer, the term of this patent is extended or adjusted under 35 U.S.C. 154(b) by 0 days.

(21) Appl. No.: 09/913,764

(22) PCT Filed: Dec. 29, 1999

(86) PCT No.: PCT/EP99/10444

§ 371 (c)(1), (2), (4) Date: Nov. 30, 2001

(87) PCT Pub. No.: WO00/49325

PCT Pub. Date: Aug. 24, 2000

(30) Foreign Application Priority Data

Feb. 20, 1999 (DE) .......................................... 199 07 412

(51) Int. Cl.[7] .......................... A44B 21/00; F16L 21/06; F16L 33/26
(52) U.S. Cl. .......................... 24/273; 24/270; 285/175; 285/256
(58) Field of Search ................... 24/273, 270; 285/175, 285/234, 256

(56) References Cited

U.S. PATENT DOCUMENTS

| 3,201,156 | A | * | 8/1965 | Coats | .......................... | 24/273 |
| 3,891,291 | A | * | 6/1975 | Nadsady et al. | ......... | 339/117 R |
| 4,008,937 | A | * | 2/1977 | Filippi | .......................... | 24/270 |
| 4,074,913 | A | * | 2/1978 | Weinhold | .................... | 285/114 |
| 4,272,871 | A | | 6/1981 | Weinhold | | |
| 4,330,142 | A | * | 5/1982 | Paini | .......................... | 285/256 |
| 4,438,958 | A | * | 3/1984 | De Cenzo | .................... | 285/234 |
| 4,463,972 | A | * | 8/1984 | Weinhold | .................... | 285/175 |
| 4,795,197 | A | | 1/1989 | Kaminski et al. | | |
| 4,969,923 | A | * | 11/1990 | Reeder et al. | ................. | 24/273 |

FOREIGN PATENT DOCUMENTS

| DE | 310 45 18 A1 | 8/1982 |
| DE | 196 40 742 A1 | 4/1998 |
| WO | WO 98/40656 | 9/1998 |

* cited by examiner

Primary Examiner—Victor Sakran
(74) Attorney, Agent, or Firm—Proskauer Rose LLP

(57) ABSTRACT

The invention relates to a hose coupling comprising a clip consisting of at least two semi-cylindrical cups (1a, 1b) enclosing the hose and a clamping lever (3) which via a bolt (4) is articulated on the free peripheral end of one of the semi-cylindrical cups (1a, 1b). To create a force-fit connection between the hose and a sleeve (8) inserted into same, the clamping lever can be connected to the other free peripheral end of the corresponding semi-cylindrical cup (1a or 1b) via a closing spring (6). The clamping jaw (1) can be fixed on the sleeve (8) in an axial direction by means of a flange which is mounted on said sleeve (8) in such a way that it cannot be axially displaced. The aim of the invention is to provide such a hose coupling which has a simple structure, is economical to produce and can be used as quick-release coupling for corrugated flexible hose. To this end, the clip comprises several semi-cylindrical cups (1a, 1b) and is configured as a single-piece clamping jaw (1) made of a plastic material. The connection(s) between the semi-cylindrical cups (1a, 1b) are configured as integral hinge(s), the hose is a corrugated flexible hose (9) and the semi-cylindrical cups (1a, 1b) on the inside of the clamping jaw (1) present a helical groove (10) which receives the corrugations of the corrugated flexible hose (9) and in this way hold said hose (9) in a form-fit connection.

9 Claims, 4 Drawing Sheets

US 6,523,230 B1

COUPLING FOR CORRUGATED FLEXIBLE HOSE

The invention relates to a hose coupling comprising a clip consisting of at least two semi-cylindrical cups enclosing the hose, and a clamping lever which via a bolt is articulated on the free peripheral end of one of the semi-cylindrical cups. To create a non-positive connection between the hose and a sleeve inserted into said hose, the clamping lever can be connected to the other free peripheral end of the corresponding semi-cylindrical cup via a closing spring, with the clamping jaw being fixable on the sleeve in axial direction by means of a flange which is arranged on said sleeve in such a way that it cannot be axially displaced.

Many different types of couplings for hoses are known. Thus a generic hose coupling is known from DE 28 49 880 A1 originating from this applicant.

Furthermore, DE 36 01 093 C2 describes such a hose coupling in which two semi-cylindrical cups are hingeably joined. However this known coupling can only be used for conventional hoses, not for corrugated flexible hoses.

Corrugated flexible hoses are thin-walled plastic hoses with corrugations made of steal that have been vulcanised-in. There are no quick-release couplings available on the market for such corrugated flexible hoses which are increasingly used in industry. Thus the hoses always have to be fixed with relatively expensive screw-connections.

It is thus the object of the invention to provide an armature which is suitable to be used as a quick-release coupling for corrugated flexible hoses. Furthermore it is desirable that the coupling is of simple construction and is economical to produce.

This object is met by a coupling for corrugated flexible hoses according to the pre-characterizing clause of claim 1, characterized in that the clip comprises several semi-cylindrical cups and is configured as a single-piece clamping jaw made of plastic material, with the connection(s) between the semi-cylindrical cups being configured as an integral hinge/as integral hinges, in that the hose is a corrugated flexible hose and in that the semi-cylindrical cups on the inside of the clamping jaw comprise a helical groove which receives the corrugations of the corrugated flexible hose, in this way holding said corrugated flexible hose in a form-fit connection.

According to the invention, a reliable frictional connection between the clamping jaw and the hose is achieved and an armature is provided which can be used as a coupling for extending and/or connecting corrugated flexible hoses. This further enhances the attractiveness of using corrugated flexible hoses. The coupling according to the invention is of simple construction and is economical to produce.

To improve the form fit between the hose and the sleeve, a further teaching of the invention provides for the semi-cylindrical cups in the interior of the clamping jaw to comprise at least one web-like elevation extending parallel to the spiral-shaped groove. This embodiment reliably ensures that the hose end located in the sleeve cannot "unscrew" from the clamping jaw.

A further teaching of the invention provides for the flange on the sleeve, which flange absorbs axial tension, to be an annular collar and that the semi-cylindrical cups in the interior of the clamping jaw comprise an annular groove for receiving the annular collar.

In an alternative embodiment of the invention, the sleeve, at its free end pointing away from the hose, comprises a flange which is movably connected to the clamping jaw. In this embodiment the flange preferably comprises a web which comprises an elongated hole through which a bolt reaches, said bolt interconnecting the clamping lever and the clamping jaw. Thus, by connecting the clamping jaw with the sleeve, this embodiment provides a captive coupling.

In a further embodiment of the invention, the coupling according to the above embodiment provides for a flange which is arranged on the sleeve so as to be rotatable but so that it cannot be axially displaced. This rotatability provides the advantage that the sleeve can rotate in the clamping jaw so that prior to closing the coupling, the corrugations of the hose can be aligned in a simple way to the shape of the clamping jaw, without the hose in the sleeve having to be rotated accordingly.

To further improve the seal between hose and sleeve, it is provided for the sleeve to comprise an annular groove in its region encompassed by the hose end, with a seal being inserted in said annular groove, said seal preferably being an o-ring/toroidal sealing ring.

Finally, in order to achieve a long service life of the coupling according to the invention, it is provided for the clamping lever to be made of stainless steel. If the closing spring is hinged to a pin arranged parallel to the bolt, preferably the bolt, the pin and/or the closing spring are made of stainless steel. In this way the coupling according to the invention can also be permanently used in a corrosive environment.

Below, the invention is shown in detail by means of a drawing showing only preferred embodiments, as follows.

Figure 1A:
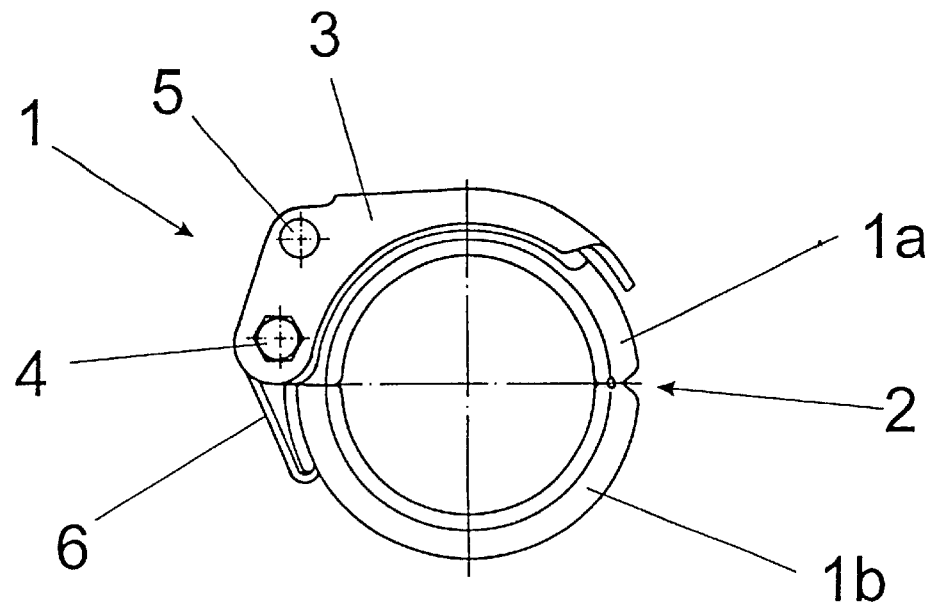
FIG. 1A shows a top view of a first embodiment of the coupling according to the invention, without hose, and with the sleeve in its closed position.
Figure 1B:
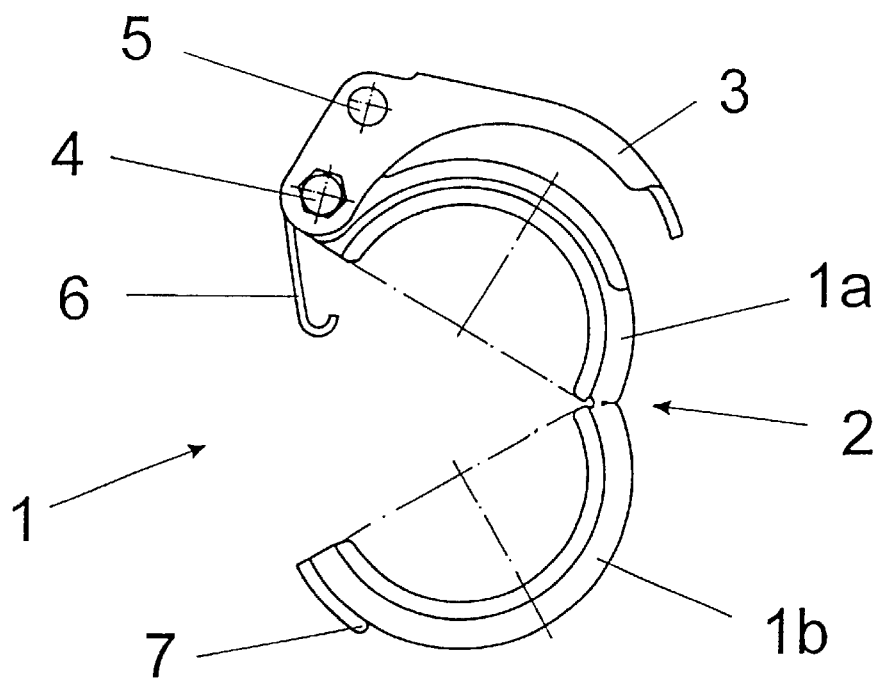
FIG. 1B shows the coupling according to FIG. 1A in its open position.
Figure 2:
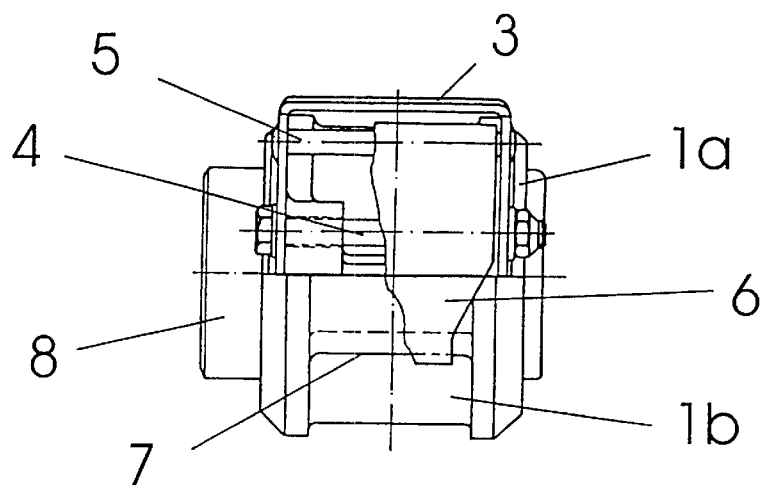
FIG. 2 shows a lateral view, partly opened up, of the coupling with the sleeve in place.

FIGS. 1 to 4 show a first preferred embodiment of the coupling for corrugated flexible hoses, according to the invention. In the embodiment shown which insofar is the preferred embodiment, a clamping jaw 1 comprises two semi-cylindrical cups 1a and 1b which are made in one piece from plastic and which comprise a hinging point which is an integral hinge 2. On the free peripheral end of the semi-cylindrical cup 1a, the clamping jaw 1 comprises a clamping lever 3 which by means of a bolt 4 is hingeably connected to the semi-cylindrical cup 1a as is shown particularly clearly in FIG. 1B. Furthermore, the clamping lever 3 comprises a pin 5 which is used to hold in place the end of a closing spring 6. The free end of the closing spring 6 is shaped such that it interacts with a lug 7 arranged on the semi-cylindrical cup 1b so as to produce the necessary closing pressure, as is shown particularly clearly in FIG. 4.

Figure 3A:
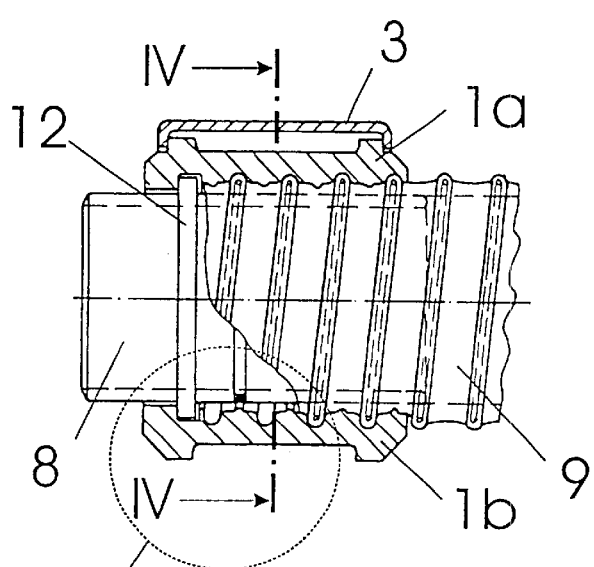
FIG. 3A shows a longitudinal view of the coupling according to FIG. 1A, with sleeve and (partly opened up) hose.
Figure 4:
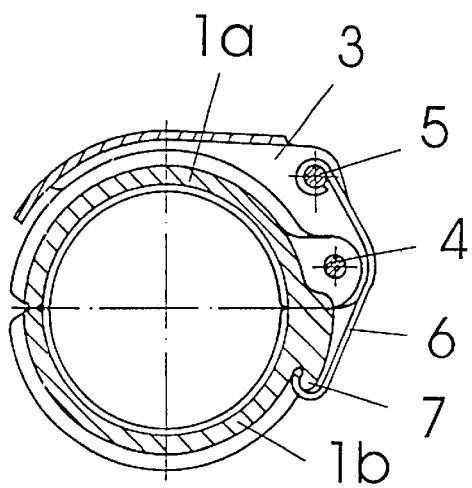
FIG. 4 shows a cross section of the coupling according to FIG. 1A, along the line IV—IV in FIG. 3A.
Figure 3B:
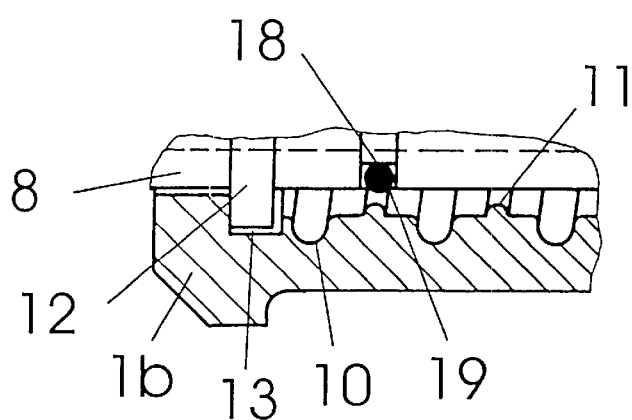
FIG. 3B is an enlarged view of the circle "X" in FIG. 3A.

For safe connection between clamping jaw 1 and sleeve 8 onto which the end of a corrugated flexible hose 9 has been placed, in the embodiment shown which insofar is the preferred embodiment, a helical groove 10 for receiving the corrugations of the hose 9 is provided in the interior of the clamping jaw 1. This is shown particularly clearly in FIGS. 3A and 3B. To increase friction between sleeve 8 and hose 9 there is a web-like elevation 11 extending parallel to the helical groove 10. This is shown in FIGS. 3A and 3B. This embodiment reliably precludes any "unscrewing" of the end of the corrugated flexible hose 9 from the clamping jaw 1, when said corrugated flexible hose 9 is subject to torsion.

So as to absorb the necessary axial tension, the sleeve 8 too has to establish a form-fit connection with the clamping jaw 1. To this effect, the sleeve comprises a flange which is arranged in such a way that it cannot be axially displaced. Preferably, said flange is an annular collar 12 which is received by an annular groove 13 of the clamping jaw 1. This too is shown particularly clearly in FIGS. 3A and 3B.

So as to provide a reliable seal between the sleeve 8 and the hose 9, the sleeve 8 comprises an annular groove 18 with an inserted seal which in the embodiment shown is a toroidal sealing ring 19. It is clear that the diameter of the toroidal sealing ring 19 matches the annular groove 18 so that the toroidal sealing ring 19 protrudes beyond the external diameter of the sleeve 8.

FIGS. 5 to 8 show a further embodiment of the coupling according to the invention, in which embodiment the clamping jaw 1 and the sleeve 8 are hingeably interconnected so that this further embodiment of the coupling according to the invention can be used as a captive coupling. For the sake of simplicity, the same reference characters have been used for the same parts.

In contrast to the first embodiment, in this embodiment the sleeve 8 comprises a flange 14 which is not arranged within the clamping jaw 1 but instead on the free end of the sleeve 8. This is shown particularly clearly in FIGS. 6 and 7. This flange 14 rests against a shoulder (no reference character) located at the free end of the sleeve 8. Said flange 14 is secured by a retaining ring 15 so that the flange 14 is arranged on the sleeve 8 so that it cannot be axially displaced but can rotate freely.

Figure 5A:
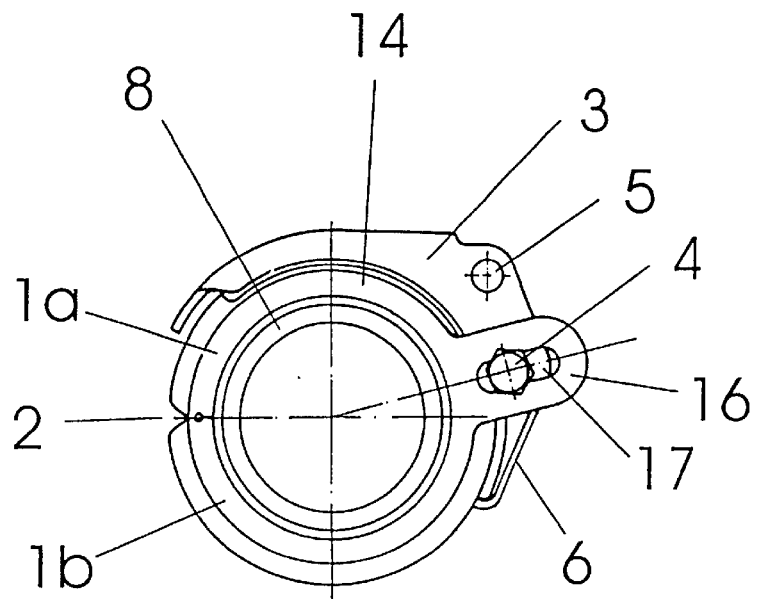
FIG. 5A shows a top view of a further embodiment of the coupling according to the invention, without hose, in its closed position.
Figure 5B:
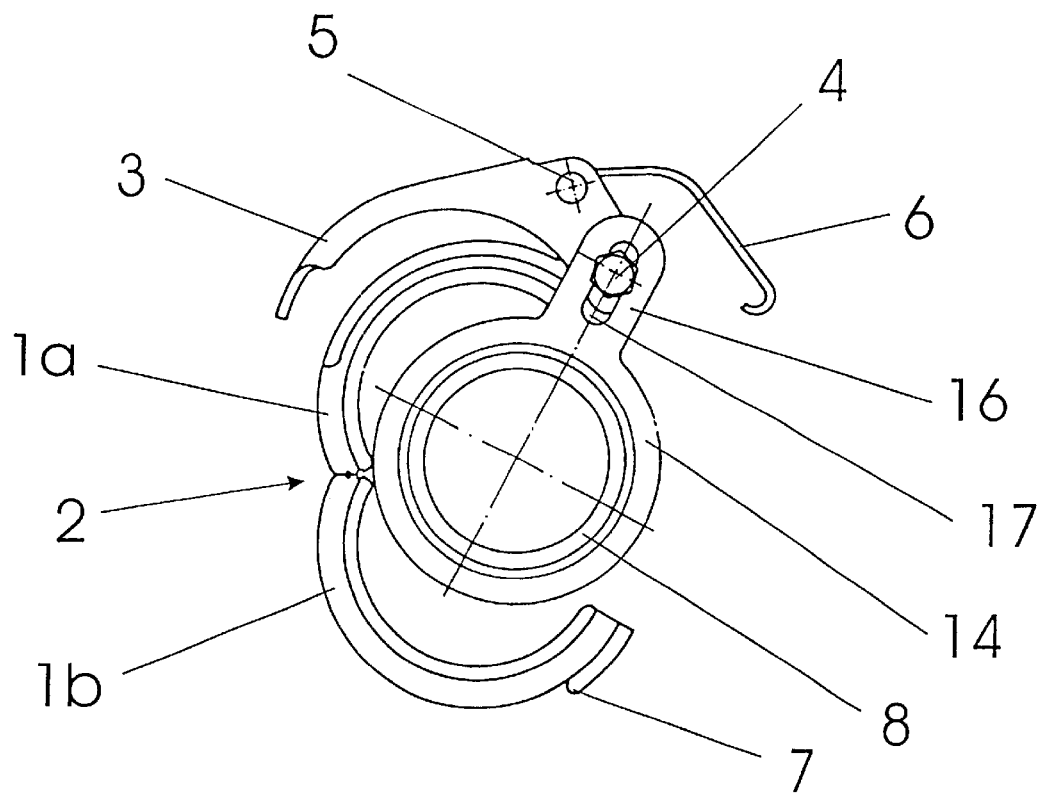
FIG. 5B shows the coupling according to FIG. 5A in its open position.
Figure 6:
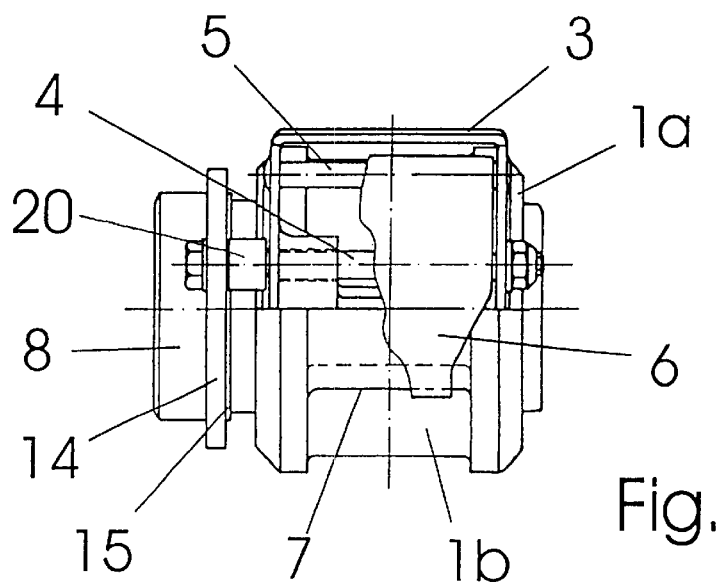
FIG. 6 shows a lateral view, partly opened up, of the coupling from FIG. 5A.
Figure 7:
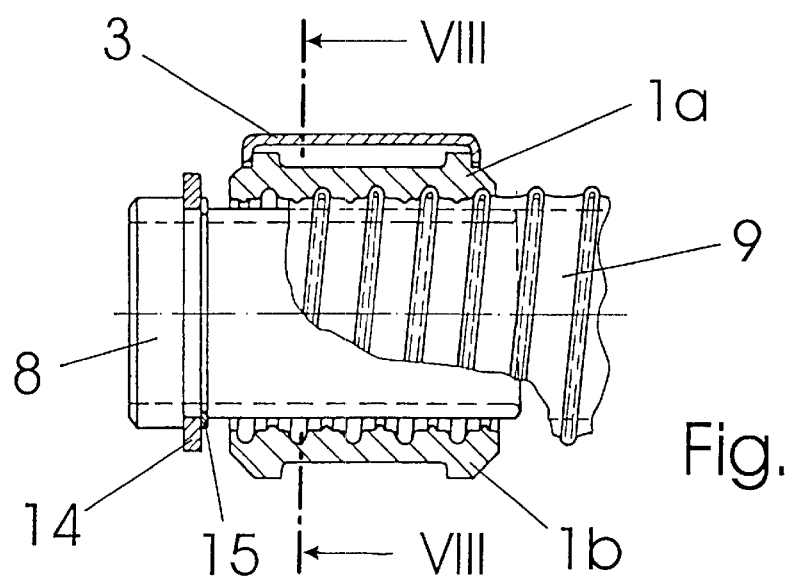
FIG. 7 shows a longitudinal section of the coupling according to FIG. 5A with hose (partly opened up)
Figure 8:
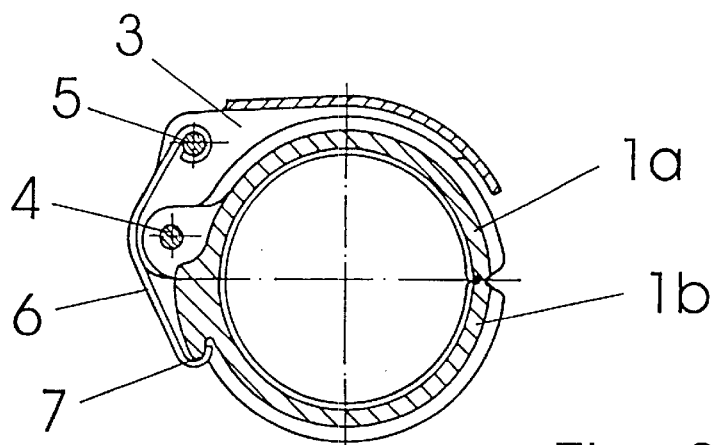
FIG. 8 shows a cross section along line VIII—VIII of FIG. 3A, of the coupling according to FIG. 1A.

In this embodiment, the flange 14 comprises a web 16 which comprises an elongated hole 17 through which a bolt 4, which connects the clamping lever 3 to the clamping jaw 1, reaches. As is shown in FIG. 5B, the elongated hole is used to swivel out the sleeve 8 from the semi-cylindrical cup 1a after the semi-cylindrical cup 1b has been swung open. Depending on the arrangement of the clamping jaw 1 and the flange 14, it may be necessary to define the spacing of the two parts in the region of the bolt 4 by using a spacer 20, as is shown in FIG. 6.

What is claimed is:

1. A hose coupling comprising:

a clip for enclosing a hose, said clip comprising at least two semi-cylindrical cups with a first free peripheral end and a second free peripheral end, said clip being configured as a single-piece clamping jaw made of a plastic material, the semi-cylindrical cups being connected to each other by at least one connection configured as an integral hinge; and a clamping lever being articulated via a bolt on the first free peripheral end of one of the semi-cylindrical cups, said clamping lever being connected to the second free peripheral end of the semi-cylindrical cups via a closing spring to produce a non-positive connection between the hose and a sleeve inserted into said hose, wherein the clamping jaw is fixable on the sleeve in an axial direction by a flange axially fixed on said sleeve, wherein the hose is a corrugated flexible hose with corrugations and the semi-cylindrical cups on their internal surfaces comprise a helical groove which receives the corrugations of the corrugated flexible hose for holding said corrugated flexible hose in a non-positive connection and at least one web-like elevation extending parallel to the helical groove.

2. The hose coupling according to claim 1, wherein the flange on the sleeve is an annular collar and the semi-cylindrical cups on their internal surfaces comprise an annular groove for receiving the annular collar.

3. The hose coupling of claim 1, wherein the clamping lever is made of stainless steel.

4. The hose coupling of claim 1, wherein the closing spring is hinged to a pin arranged parallel to the bolt, said bolt, pin and closing spring being made of stainless steel.

5. The hose coupling of claim 1, wherein the sleeve at its free end pointing away from the hose comprises a flange movably connected to the clamping jaw.

6. The hose coupling of claim 5, wherein the flange comprises a web with an elongated hole through which the bolt extends, said bolt interconnecting the clamping lever and the clamping jaw.

7. The hose coupling of claim 5, wherein the flange arranged on the sleeve is rotatable but not axially diplaceable.

8. The hose coupling of claim 1, wherein the sleeve, in a region encompassed by the hose end, comprises an annular groove with a seal inserted in said annular groove.

9. The hose coupling of claim 8, wherein the seal is a toroidal sealing ring.

\* \* \* \* \*